I
US010180222B2

(12) United States Patent
Tanaka et al.

(10) Patent No.: US 10,180,222 B2
(45) Date of Patent: Jan. 15, 2019

(54) OPTICAL UNIT

(71) Applicant: KOITO MANUFACTURING CO., LTD., Tokyo (JP)

(72) Inventors: Hidetada Tanaka, Shizuoka (JP); Takayuki Yagi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 15/711,382

(22) Filed: Sep. 21, 2017

(65) Prior Publication Data

US 2018/0106447 A1 Apr. 19, 2018

(30) Foreign Application Priority Data

Oct. 14, 2016 (JP) .................................. 2016-202551
Jan. 10, 2017 (JP) .................................. 2017-001996

(51) Int. Cl.
| | |
|---|---|
| *F21V 21/00* | (2006.01) |
| *G06K 7/10* | (2006.01) |
| *G06K 7/14* | (2006.01) |
| *F21S 41/141* | (2018.01) |
| *F21S 41/675* | (2018.01) |
| *F21S 41/147* | (2018.01) |
| *F21S 41/19* | (2018.01) |
| *F21S 41/39* | (2018.01) |
| *G03B 21/20* | (2006.01) |
| *F21S 41/143* | (2018.01) |
| *F21S 41/255* | (2018.01) |

(Continued)

(52) U.S. Cl.
CPC ........... *F21S 41/141* (2018.01); *F21S 41/143* (2018.01); *F21S 41/147* (2018.01); *F21S 41/151* (2018.01); *F21S 41/153* (2018.01); *F21S 41/19* (2018.01); *F21S 41/192* (2018.01); *F21S 41/255* (2018.01); *F21S 41/39* (2018.01); *F21S 41/663* (2018.01); *F21S 41/675* (2018.01); *G03B 21/2013* (2013.01); *G03B 21/2046* (2013.01); *B60Q 1/0683* (2013.01); *F21S 41/686* (2018.01)

(58) Field of Classification Search
USPC ................................. 235/454, 455; 362/545
See application file for complete search history.

(56) References Cited

U.S. PATENT DOCUMENTS

| | | | | |
|---|---|---|---|---|
| 7,575,352 B2 * | 8/2009 | Sato | ....................... | B60Q 1/076 362/514 |
| 2005/0270792 A1 * | 12/2005 | Suzuki | .................... | F21S 41/17 362/517 |

(Continued)

FOREIGN PATENT DOCUMENTS

JP  2015-026628 A  2/2015

*Primary Examiner* — Tuyen K Vo
(74) *Attorney, Agent, or Firm* — Osha Liang LLP

(57) ABSTRACT

An optical unit includes a first light source, a second light source, a rotary reflector rotating around its rotation axis while reflecting a first light emitted from the first light source, and a projection lens configured to project the first light reflected by the rotary reflector in a light irradiation direction of the optical unit. The second light source is disposed such that a second light emitted from the second light source is incident on the projection lens without being reflected by the rotary reflector. The projection lens is configured to project the second light in the light irradiation direction of the optical unit.

13 Claims, 18 Drawing Sheets

(51) Int. Cl.
 *F21S 41/663* (2018.01)
 *F21S 41/153* (2018.01)
 *F21S 41/151* (2018.01)
 *F21S 41/686* (2018.01)
 *B60Q 1/068* (2006.01)

(56) References Cited

U.S. PATENT DOCUMENTS

| | | | |
|---|---|---|---|
| 2008/0247182 A1* | 10/2008 | Yasuda | B60Q 1/076 362/465 |
| 2009/0086500 A1* | 4/2009 | Tatara | B60Q 1/076 362/512 |
| 2010/0033978 A1* | 2/2010 | Ehm | B60Q 1/085 362/465 |
| 2013/0038736 A1 | 2/2013 | Yamamura | |
| 2014/0043805 A1* | 2/2014 | Yamamura | F21K 9/56 362/231 |
| 2014/0313755 A1* | 10/2014 | Tanaka | F21S 41/19 362/514 |
| 2016/0169469 A1* | 6/2016 | Sugiyama | F21S 41/135 362/19 |
| 2017/0159903 A1 | 6/2017 | Yamamura | |
| 2017/0159904 A1 | 6/2017 | Yamamura | |
| 2017/0185855 A1 | 6/2017 | Yamamura | |

\* cited by examiner

OPTICAL UNIT

CROSS-REFERENCE TO RELATED APPLICATIONS

This application claims priorities from Japanese Patent Applications No. 2016-202551 filed on Oct. 14, 2016 and No. 2017-001996 filed on Jan. 10, 2017, the entire contents of which are incorporated herein by reference.

FIELD

The present invention relates to an optical unit, and particularly, to an optical unit used for a vehicle lamp.

BACKGROUND

Recently, a device has been devised in which a predetermined light distribution pattern is formed by reflecting light emitted from a light source toward the front of a vehicle and scanning the region in front of the vehicle with the reflected light. For example, there is known an optical unit which includes a rotary reflector and a plurality of light sources. The rotary reflector rotates in one direction around its rotation axis while reflecting light emitted from a light source. The plurality of light sources is composed of light emitting elements. The rotary reflector is provided with a reflecting surface such that the light of the light sources reflected by the rotary reflector rotating forms a desired light distribution pattern. The plurality of light sources is arranged such that the lights emitted from the light sources are reflected at different position of the reflecting surface (see, Patent Document 1).

Patent Document 1: JP 2015-26628 (A)

However, when scanning a wide range with the light reflected by the rotary reflector, a decrease in the maximum luminous intensity and deterioration in the image forming property are liable to occur. Therefore, in the above-described optical unit, a diffusing LED unit for realizing diffused light to irradiate a wide range is provided, apart from a condensing LED unit for realizing strong condensing on the front side in a travelling direction. Further, light emitted from the condensing LED unit is reflected at a first position of the rotary reflector, and then, is projected forward through a first projection lens. In addition, light emitted from the diffusing LED unit is reflected at a second position of the rotary reflector, and then, is projected forward through a second projection lens. Therefore, a plurality of projection lenses is required, and the entire unit tends to be large.

SUMMARY

The present invention has been made in consideration of such situations, and an object thereof is to provide a new optical unit capable of irradiating a wide range with a simple configuration.

In order to solve the above problem, an optical unit according to one aspect of the present invention includes a first light source, a second light source, a rotary reflector rotating around its rotation axis while reflecting a first light emitted from the first light source, and a projection lens for projecting the first light reflected by the rotary reflector in a light irradiation direction of the optical unit. The second light source is disposed such that the emitted second light is incident on the projection lens without being reflected by the rotary reflector, and the projection lens projects the second light in the light irradiation direction of the optical unit.

According to this aspect, since the second light emitted from the second light source is incident on the projection lens without being reflected by the rotary reflector, it is possible to select optical characteristics of the second light without considering the reflection by the rotary reflector. Therefore, it is possible to irradiate a wider range by, for example, using the second light source having a wider viewing angle than the first light source.

The second light source may be disposed between a substrate on which the first light source is mounted and the rotary reflector, in a front view seen from the front of the vehicle. In this way, the second light source can be placed without widening the width of the optical unit.

The projection lens may be configured to project the first light incident thereon after being reflected by the rotary reflector as a condensed light distribution pattern in the light irradiation direction of the optical unit and to project the second light incident thereon without being reflected by the rotary reflector as a diffused light distribution pattern in the light irradiation direction of the optical unit. In this way, it is possible to irradiate a wide range without lowering the luminous intensity of the light distribution pattern much.

Another aspect of the present invention is also an optical unit. The optical unit includes a first light source, a rotary reflector rotating around its rotation axis while reflecting a first light emitted from the first light source, a projection lens for projecting the first light reflected by the rotary reflector in a light irradiation direction of the optical unit, a second light source disposed between the first light source and the projection lens, and an optical member for changing an optical path of the second light emitted from the second light source and directing the second light toward the projection lens. The second light source is disposed such that the emitted second light is incident on the projection lens without being reflected by the rotary reflector.

According to this aspect, since the second light emitted from the second light source is incident on the projection lens without being reflected by the rotary reflector, it is possible to select optical characteristics of the second light without considering the reflection by the rotary reflector. Therefore, it is possible to irradiate a wider range by, for example, using the second light source having a wider viewing angle than the first light source. Further, since the optical member changes the optical path of the second light and directs the second light toward the projection lens, it is possible to adjust the place where the second light source is disposed, and thus, the degree of freedom in the layout of the parts constituting the optical unit is increased.

The projection lens may be configured to project the first light incident thereon after being reflected by the rotary reflector as a condensed light distribution pattern in the light irradiation direction of the optical unit and to project the second light incident thereon without being reflected by the rotary reflector as a diffused light distribution pattern in the light irradiation direction of the optical unit. In this way, it is possible to irradiate a wide range without lowering the luminous intensity of the light distribution pattern much.

The second light source may include a plurality of light emitting elements arranged in an array form. In this way, it is possible to change the irradiation range in a stepwise manner.

Yet another aspect of the present invention is also an optical unit. The optical unit includes a first light source, a rotary reflector rotating around its rotation axis while reflecting a first light emitted from the first light source, a projection lens for projecting the first light reflected by the rotary reflector in a light irradiation direction of the optical unit, a second light source disposed between the first light source and the projection lens, and an optical member for reflecting the second light emitted from the second light source and directing the second light toward the projection lens. The second light source is disposed such that the emitted second light is incident on the projection lens without being reflected by the rotary reflector.

According to this aspect, since the second light emitted from the second light source is incident on the projection lens without being reflected by the rotary reflector, it is possible to select optical characteristics of the second light without considering the reflection by the rotary reflector. Therefore, it is possible to irradiate a wider range by, for example, using the second light source having a wider viewing angle than the first light source.

Still another aspect of the present invention is also an optical unit. The optical unit includes a light source and a rotary reflector rotating around its rotation axis while reflecting light emitted from the light source. The rotary reflector is provided with a reflecting surface such that a predetermined light distribution pattern is formed by scanning the front side with the light reflected by the rotary reflector rotating. The light source includes first light emitting parts configured to emit a first light for scanning a first region including a maximum luminous intensity region of the light distribution pattern and second light emitting parts configured to emit a second light for scanning a second region adjacent to the first region. When the sum of the lengths of the first light emitting parts in a longitudinal direction is expressed as L1 and the sum of the lengths of the second light emitting parts in a direction parallel to the longitudinal direction of the first light emitting parts is expressed as L2, a relationship of $L1>L2$ is satisfied.

According to this aspect, since the second light emitting parts for scanning the second region adjacent to the first region are provided in addition to the first light emitting parts for scanning the first region including the maximum luminous intensity region, a wider range of irradiation becomes possible while satisfying the maximum luminous intensity.

When the number of light emitting elements constituting the first light emitting parts is expressed as N1 and the number of light emitting elements constituting the second light emitting parts is expressed N2, a relationship of $N1>N2$ is satisfied. In this way, it is possible to suppress the number of the light emitting elements in the second light emitting parts that emit the second light for scanning the second region not including the maximum luminous intensity region.

The area of the second light emitting parts is smaller than that of the first light emitting parts. In this way, for example, the number of the light emitting elements constituting the second light emitting parts can be suppressed, as compared with the first light emitting parts.

The second light emitting parts may have a plurality of light emitting regions spaced apart from each other with a non-light emitting region interposed therebetween. In this way, it is possible to irradiate a wide range without increasing the size of the second light emitting parts.

The plurality of light emitting regions may be provided adjacent to each of both end portions in the longitudinal direction of the first light emitting parts. In this way, a region having the same width as the first light emitting parts can be irradiated by the second light emitting parts.

According to the present invention, it is possible to realize a new optical unit capable of irradiating a wide range with a simple configuration.

EMBODIMENTS

Figure 1:
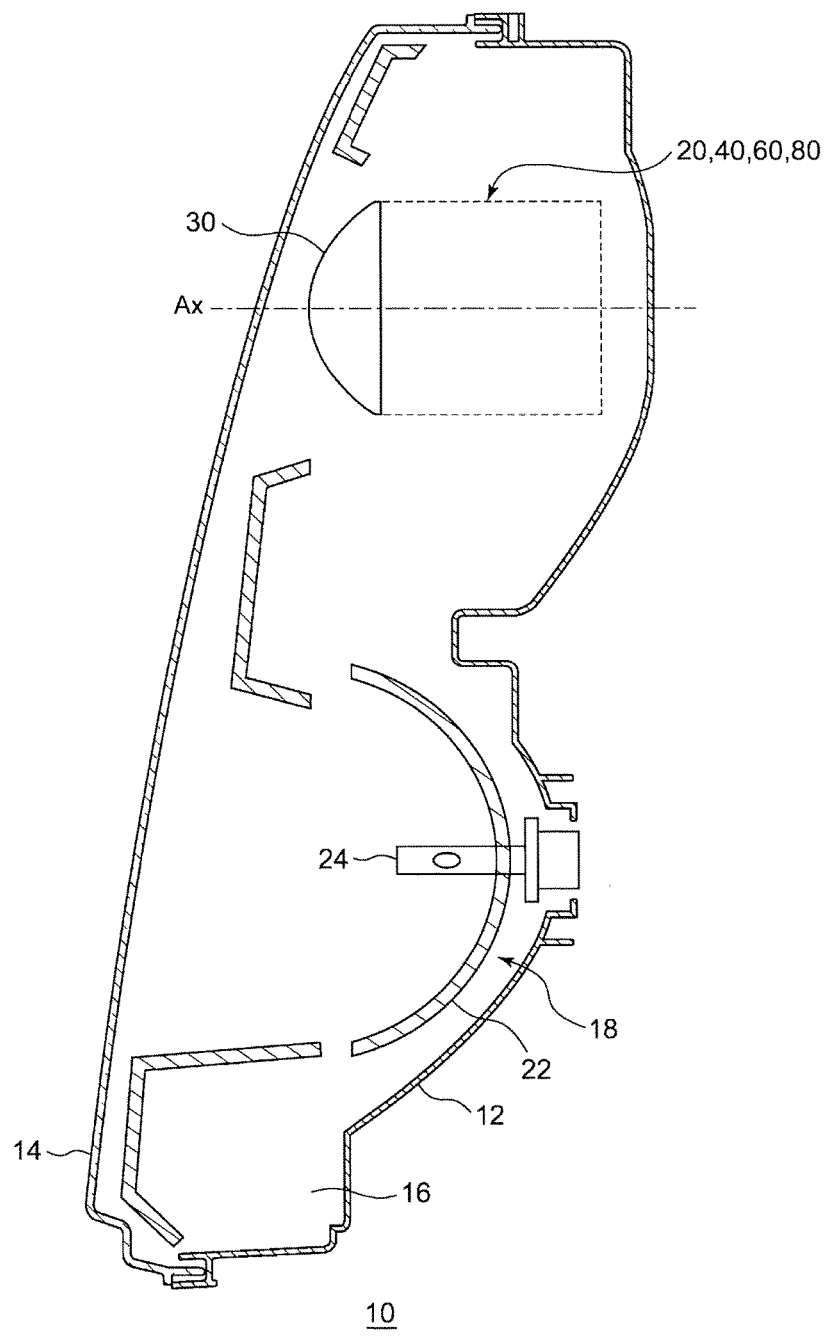
FIG. 1 is a horizontal sectional view of a vehicle headlamp.

Hereinafter, based on embodiments, the present invention will be described with reference to the drawings. The same or similar constituent elements, members or processes shown in each drawing are denoted by the same reference numerals, and the repeated explanations are omitted as appropriate. Further, the embodiments are not intended to limit the invention but are examples. All the features described in the embodiments and combinations thereof are not necessarily essential to the invention.

An optical unit of the present invention can be used for various vehicle lamps. First, an outline of a vehicle headlamp will be described. An optical unit according to each embodiment (to be described later) can be mounted on the vehicle headlamp.

Vehicle Headlamp

Figure 2:
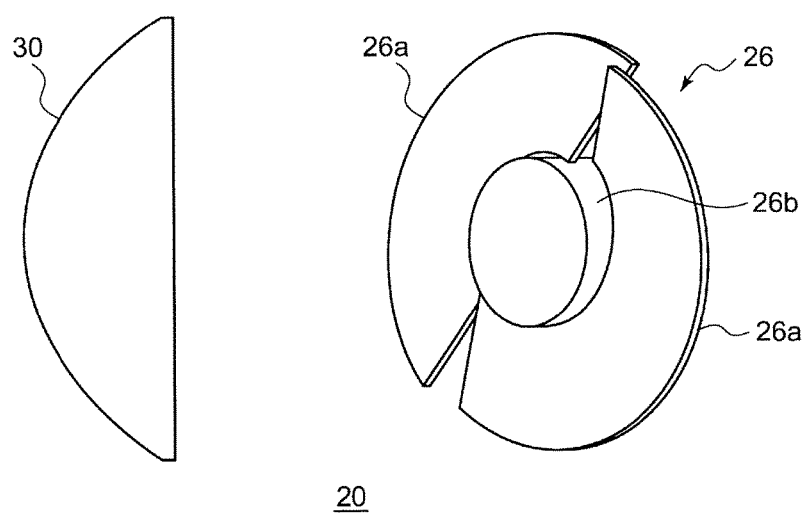
FIG. 2 is a top view schematically showing a configuration of an optical unit according to a reference example.
Figure 3:
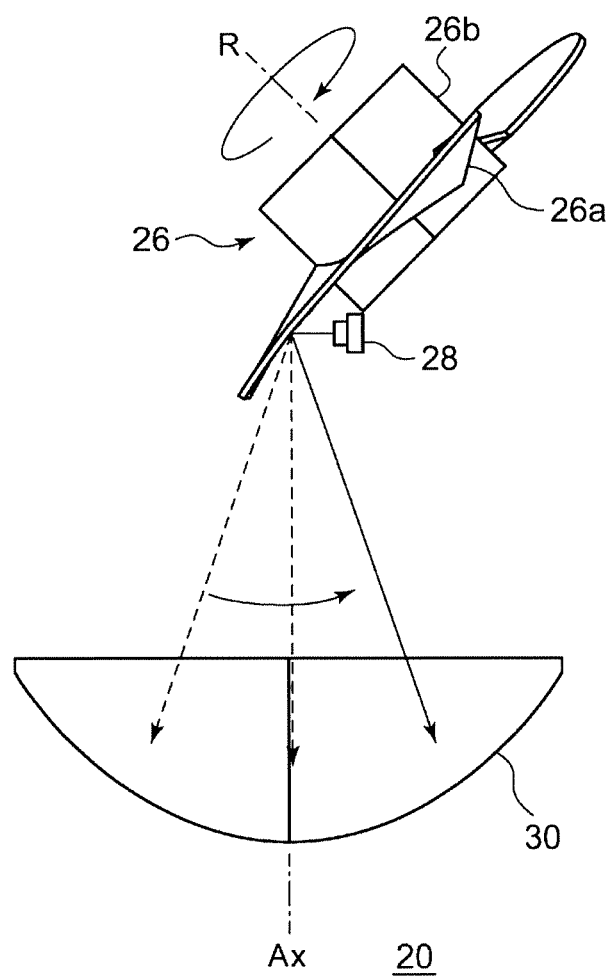
FIG. 3 is a side view of the optical unit according to the reference example.

FIG. 1 is a horizontal sectional view of a vehicle headlamp. FIG. 2 is a top view schematically showing a configuration of an optical unit according to a reference example. FIG. 3 is a side view of the optical unit according to the reference example.

A vehicle headlamp 10 shown in FIG. 1 is a right headlamp mounted on the right side of a front end portion of an automobile and has the same structure as a left headlamp mounted on the left side except that it is bilaterally symmetrical with the left headlamp. Therefore, hereinafter, the right vehicle headlamp 10 will be described in detail, and the description of the left vehicle headlamp will be omitted.

As shown in FIG. 1, the vehicle headlamp 10 includes a lamp body 12 having a recess opening forward. The front opening of the lamp body 12 is covered with a transparent front cover 14, thereby forming a lamp chamber 16. The lamp chamber 16 functions as a space in which two lamp units 18, 20 are accommodated in a state of being arranged side by side in a vehicle width direction.

Out of the lamp units, the lamp unit disposed on the outer side, i.e., the lamp unit 20 disposed on the upper side in FIG. 1 in the right vehicle headlamp 10 is a lamp unit including a lens. The lamp unit 20 is configured to irradiate a variable high beam. On the other hand, out of the lamp units, the lamp unit disposed on the inner side, i.e., the lamp unit 18 disposed on the lower side in FIG. 1 in the right vehicle headlamp 10 is configured to irradiate a low beam.

The low-beam lamp unit 18 includes a reflector 22, a light source bulb (incandescent bulb) 24 supported on the reflector 22, and a shade (not shown). The reflector 22 is supported tiltably with respect to the lamp body 12 by known means (not shown), for example, means using an aiming screw and a nut.

The lamp unit 20 is an optical unit that includes a rotary reflector 26, an LED 28, and a convex lens 30 as a projection lens disposed in front of the rotary reflector 26. Meanwhile, instead of the LED 28, a semiconductor light emitting element such as an EL element or an LD element can be used as the light source. Particularly for the control of shielding a part of a light distribution pattern (to be described later), it is desirable to use a light source capable of precisely performing the turning on/off in a short time. Although the shape of the convex lens 30 can be appropriately selected according to the light distribution characteristics such as a light distribution pattern or an illuminance pattern required, an aspherical lens or a free-curved surface lens is used.

The rotary reflector 26 rotates in one direction around its rotation axis R by a drive source such as a motor (not shown). Further, the rotary reflector 26 has a reflecting surface configured to reflect light emitted from the LED 28 while rotating and to form a desired light distribution pattern.

The rotary reflector 26 is configured such that two blades 26a serving as the reflecting surface and having the same shape are provided around a cylindrical rotating part 26b. The rotation axis R of the rotary reflector 26 is oblique to an optical axis Ax and is provided in a plane including the optical axis Ax and the LED 28. In other words, the rotation axis R is provided substantially in parallel with a scanning plane of the light (irradiation beam) of the LED 28 which scans in a left and right direction by rotation. In this way, the thickness of the optical unit can be reduced. Here, the scanning plane can be regarded as a fan-shaped plane that is formed by continuously connecting the locus of the light of the LED 28 as the scanning light, for example. Further, in the lamp unit 20 according to the present embodiment, the LED 28 provided is relatively small, and the position where the LED 28 is disposed is located between the rotary reflector 26 and the convex lens 30 and is deviated from the optical axis Ax. Therefore, the dimension in a depth direction (a vehicle front-rear direction) of the vehicle headlamp 10 can be shortened, as compared with the case where a light source, a reflector, and a lens are arranged in a line on an optical axis as in a conventional projector-type lamp unit.

Further, the shapes of the blades 26a of the rotary reflector 26 are configured such that a secondary light source of the LED 28 due to reflection is formed near a focal point of the convex lens 30. In addition, each of the blades 26a has a shape twisted so that an angle formed by the optical axis Ax and the reflecting surface changes along a circumferential direction with the rotation axis R as a center. In this way, as shown in FIG. 3, the scanning using the light of the LED 28 becomes possible.

First Embodiment

In a scanning optical system using the rotary reflector 26, when a diffusing (scanning) range is expanded, there is a possibility that the maximum luminous intensity is lowered and the image forming property is deteriorated. Therefore, a practical scanning range is about ±10° C. with respect to the optical axis (central axis). Since the above-described lamp unit 20 forms a high-beam light distribution pattern by a single light source, there is a limit to widening the scanning range. Therefore, in the optical unit according to each of the following embodiments, a plurality of light sources is provided in order to widen the irradiation range of the high-beam light distribution pattern.

Figure 4:
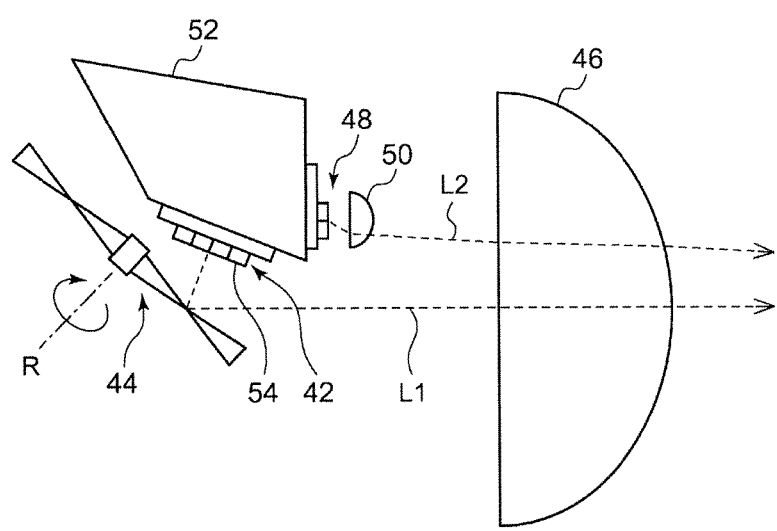
FIG. 4 is a schematic view of an optical unit according to a first embodiment, as seen from above.
Figure 5:
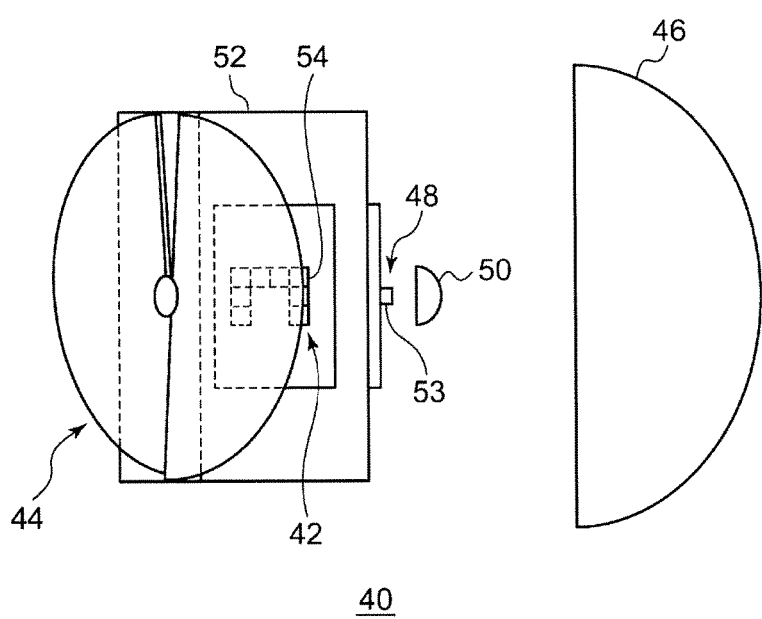
FIG. 5 is a schematic view of the optical unit shown in FIG. 4, as seen from the side.
Figure 6:
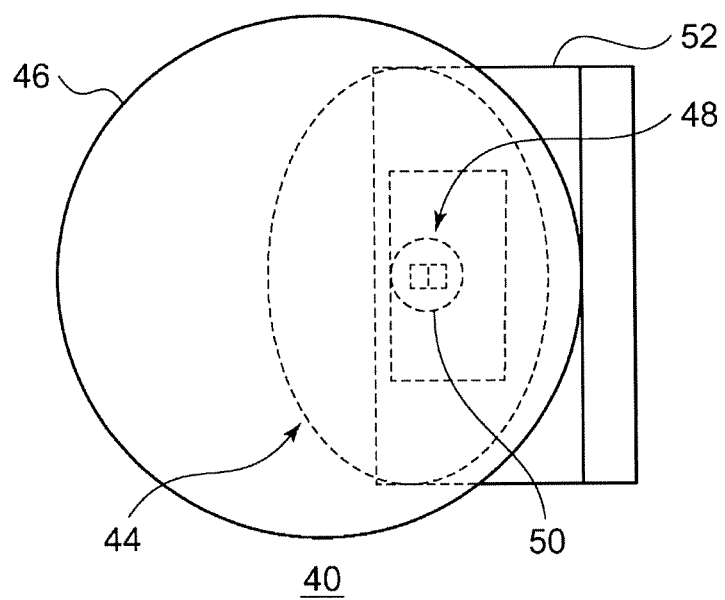
FIG. 6 is a schematic view of the optical unit shown in FIG. 4, as seen from the front.

FIG. 4 is a schematic view of an optical unit 40 according to a first embodiment, as seen from above. FIG. 5 is a schematic view of the optical unit 40 shown in FIG. 4, as seen from the side. FIG. 6 is a schematic view of the optical unit 40 shown in FIG. 4, as seen from the front.

The optical unit 40 according to the present embodiment includes a first light source 42, a rotary reflector 44 rotating around its rotation axis R while reflecting a first light L1 emitted from the first light source 42, a projection lens 46 for projecting the first light L1 reflected by the rotary reflector 44 in a light irradiation direction (right direction in FIG. 4) of the optical unit, a second light source 48 disposed between the first light source 42 and the projection lens 46, an inner lens 50 which is an optical member configured to change an optical path of a second light L2 emitted from the second light source 48 and directing the second light L2 toward the projection lens 46, and a heat sink 52 on which the first light source 42 and the second light source 48 are mounted.

In the first light source 42, a plurality of light emitting modules is arranged in an array form. Specifically, eight light emitting modules 54 are arranged in three stages. That is, four light emitting modules 54 are arranged in an upper stage, two light emitting modules 54 are arranged in a middle stage, and two light emitting modules 54 are arranged in a lower stage. The two light emitting modules 54 in the middle stage are disposed adjacent to the lower side of the light emitting modules 54 at both ends of the four light emitting modules 54 in the upper stage. The two light emitting modules 54 in the lower stage are disposed adjacent to the lower side of the two light emitting modules 54 in the middle stage.

Figure 7A:
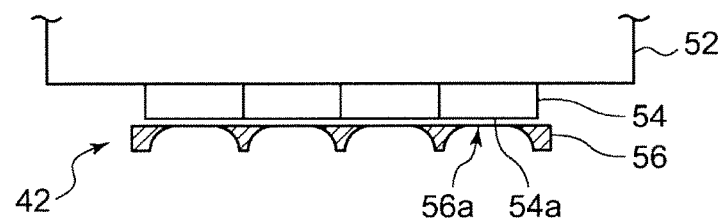
FIG. 7A is an enlarged schematic view of a main part of a first light source according to the present embodiment.
Figure 7B:
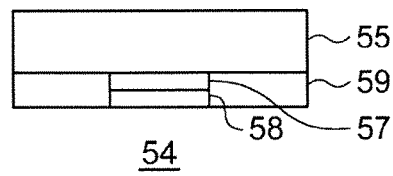
FIG. 7B is an enlarged schematic view of a main part of a light emitting module according to the present embodiment.

FIG. 7A is an enlarged schematic view of a main part of a first light source according to the present embodiment, and FIG. 7B is an enlarged schematic view of a main part of a light emitting module according to the present embodiment.

As shown in FIG. 7A, small reflectors 56 in which openings 56*a* corresponding to light emitting surfaces 54*a* are formed in a lattice form are disposed on the side of the light emitting surfaces 54*a* of the light emitting modules 54. In this way, the light emitted from the light emitting modules 54 reaches the reflecting surface of the rotary reflector 44 without being diffused much.

As shown in FIG. 7B, each light emitting module 54 has a rectangular LED 57 mounted on a circuit board 55, a light wavelength conversion member 58 mounted on a light emitting surface of the LED 57, and a frame body 59 provided so as to surround an outer periphery of the LED 57 and the light wavelength conversion member 58. The LED 57 is, for example, a semiconductor light emitting element that emits blue light. The light wavelength conversion member 58 is, for example, formed by dispersing YAG ceramics or YAG powder for emitting yellow light in a resin. The frame body 59 is a white resin in which white powder is dispersed. The frame body 59 reflects the light emitted from the side surface of the LED 57 and the light wavelength conversion member 58.

In the second light source 48, two light emitting modules 53 are arranged side by side in a horizontal direction in an array form, and each of the light emitting modules 53 can be individually turned on/off. A specific configuration of each light emitting module 53 is the same as that of the light emitting module 54.

The second light source 48 according to the present embodiment is disposed such that the second light L2 is incident on the projection lens 46 without being reflected by the rotary reflector 44. In this way, it is possible to select optical characteristics of the second light L2 emitted from the second light source 48 without considering the reflection by the rotary reflector 44. Therefore, it is possible to irradiate a wider range by, for example, using the second light source 48 having a wider viewing angle than the first light source 42. Here, the viewing angle is an index expressed by an emission angle of light, of which both ends are set as positions where the emission intensity is half of a peak value.

Further, since the inner lens 50 changes the optical path of the second light L2 and directs the second light L2 toward the rotary reflector 44, it is possible to adjust the place where the second light source 48 is disposed. For example, in the optical unit 40 according to the present embodiment, when the inner lens 50 is not provided, the position of the second light source 48 appropriate for the projection lens 46 is located behind the heat sink 52, which makes the layout difficult. However, by disposing a member for changing the optical path of light, such as the inner lens 50, at a position between the second light source 48 and the projection lens 46, the second light L2 emitted from the second light source 48 can be regarded as if it reached the projection lens 46 from behind the heat sink 52. Therefore, the flexibility in the layout of the parts constituting the optical unit 40 including the second light source 48 is increased.

Figure 8:
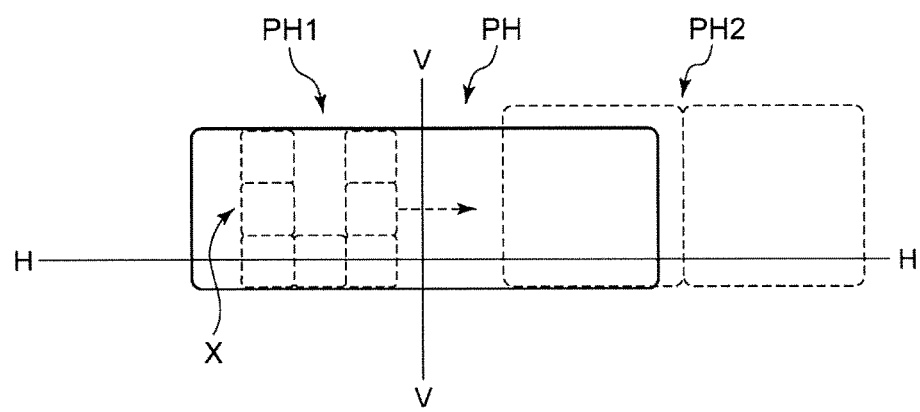
FIG. 8 is a view schematically showing a light distribution pattern formed by a vehicle headlamp including the optical unit according to the first embodiment.

FIG. 8 is a view schematically showing a light distribution pattern formed by a vehicle headlamp including the optical unit according to the first embodiment. A high-beam light distribution pattern PH shown in FIG. 8 is obtained by combining a condensed light distribution pattern PH1 and a diffused light distribution pattern PH2. The focused light distribution pattern PH1 is formed in such a way that the first light L1, which is reflected by the rotary reflector 44 and then is incident on the projection lens 46, is projected as a light source image X of the first light source 42 and is scanned in the horizontal direction. On the other hand, the diffused light distribution pattern PH2 is formed in such a way that the second light L2, which is incident on the projection lens 46 without being reflected by the rotary reflector 44, is projected in the light irradiation direction of the optical unit 40. The diffused light distribution pattern PH2 irradiates the region on the right side of a right end portion of the condensed light distribution pattern PH1. In this way, a wider range can be irradiated with a simple configuration without lowering the maximum luminous intensity of the high-beam light distribution pattern PH much.

Further, the second light source 48 includes a plurality of light emitting modules 53 arranged in an array form and is configured such that the light of the light emitting modules 53 can be individually adjusted. In this way, the irradiation range can be widened in a stepwise manner.

Second Embodiment

Figure 9:
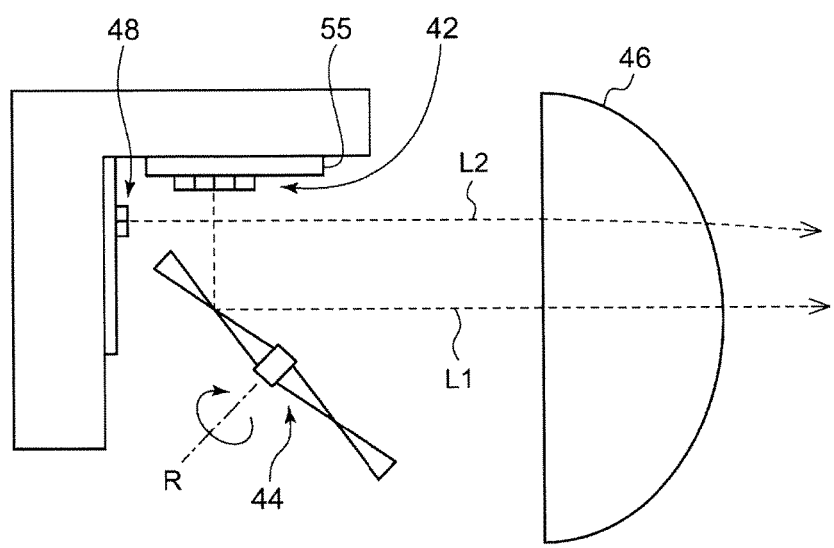
FIG. 9 is a schematic view of an optical unit according to a second embodiment, as seen from above.
Figure 10:
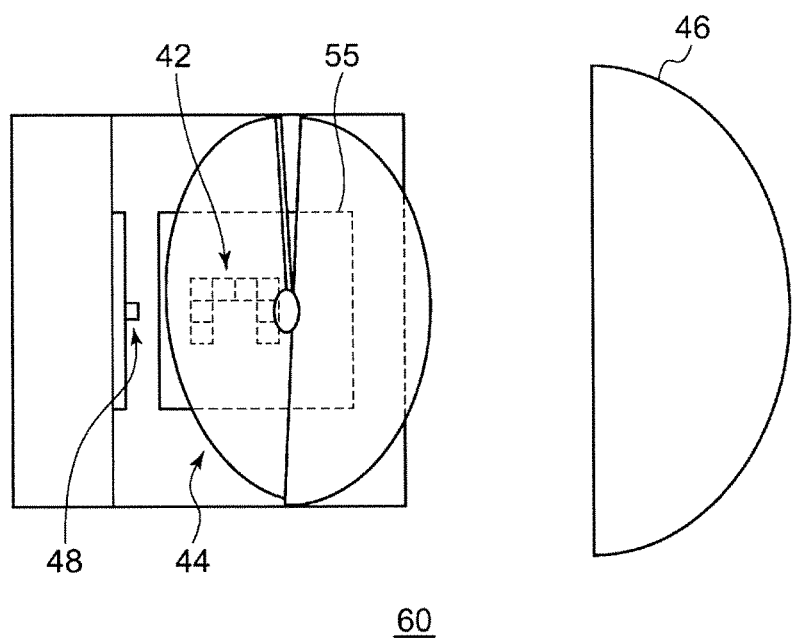
FIG. 10 is a schematic view of the optical unit shown in FIG. 9, as seen from the side.
Figure 11:
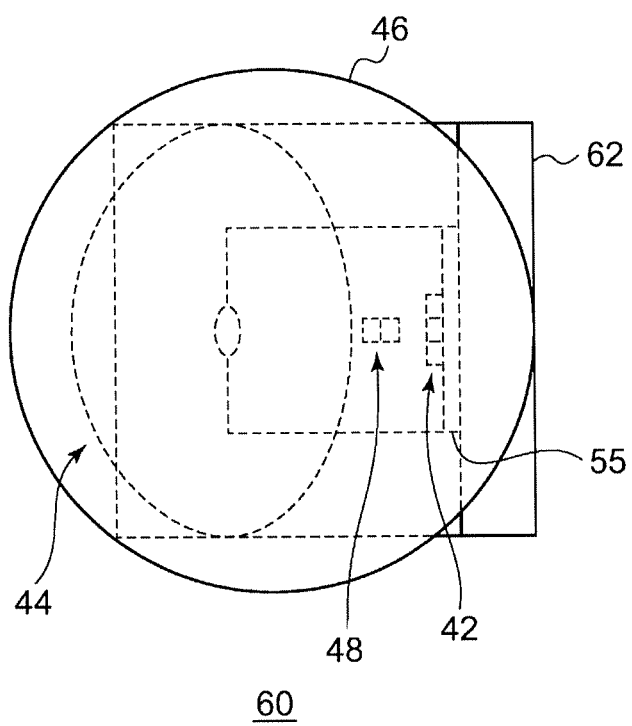
FIG. 11 is a schematic view of the optical unit shown in FIG. 9, as seen from the front.

FIG. 9 is a schematic view of an optical unit 60 according to a second embodiment, as seen from above. FIG. 10 is a schematic view of the optical unit 60 shown in FIG. 9, as seen from the side. FIG. 11 is a schematic view of the optical unit 60 shown in FIG. 9, as seen from the front. Meanwhile, the same components as those of the optical unit according to the first embodiment are denoted by the same reference numerals, and explanation thereof is appropriately omitted.

The optical unit 60 according to the second embodiment includes the first light source 42, the second light source 48, the rotary reflector 44 rotating around its rotation axis R while reflecting the first light L1 emitted from the first light source 42, the projection lens 46 for projecting the first light L1 reflected by the rotary reflector 111 in the light irradiation direction of the optical unit 60, and a heat sink 62 on which the first light source 42 and the second light source 48 are mounted. The second light source 48 is disposed such that the emitted second light L2 is directly incident on the projection lens 46 without being reflected by the rotary reflector 44. The projection lens 46 projects the second light L2 in the light irradiation direction of the optical unit 60.

In this way, it is possible to select optical characteristics of the second light L2 emitted from the second light source 48 without considering the reflection by the rotary reflector 44. Therefore, it is possible to irradiate a wider range with a simple configuration by using the second light source 48 having a wider viewing angle than the first light source 42.

The second light source 48 is disposed between the circuit board 55 on which the first light source 42 is mounted and the rotary reflector 44, in a front view (shown in FIG. 11) seen from the front of the vehicle. In this way, the second light source 48 can be placed without widening the width of the optical unit 60. Further, the optical unit 60 according to the present embodiment can form the high-beam light distribution pattern PH shown in FIG. 8, similar to the optical unit 40 according to the first embodiment.

Third Embodiment

Figure 12:
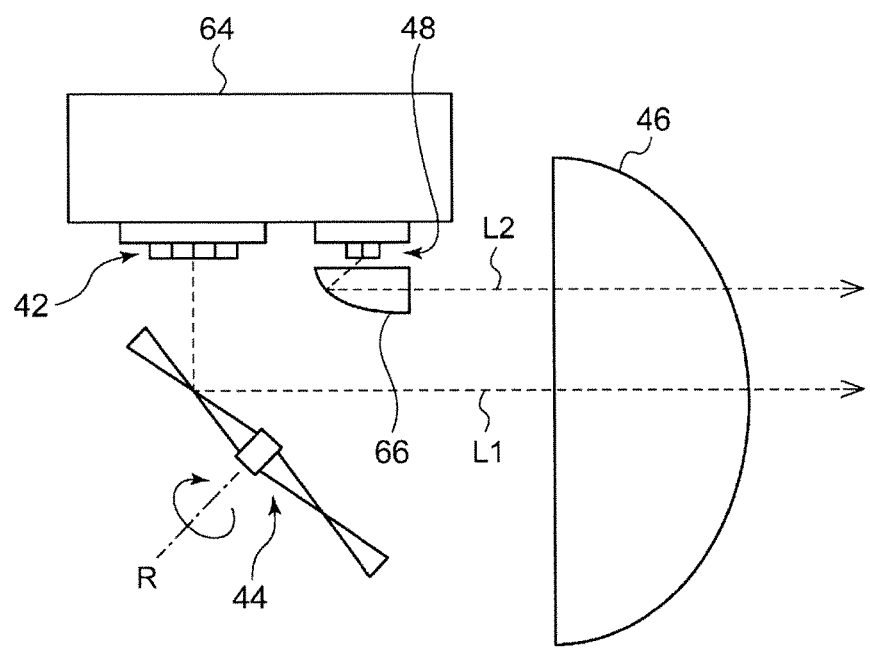
FIG. 12 is a schematic view of an optical unit according to a third embodiment, as seen from above.
Figure 13:
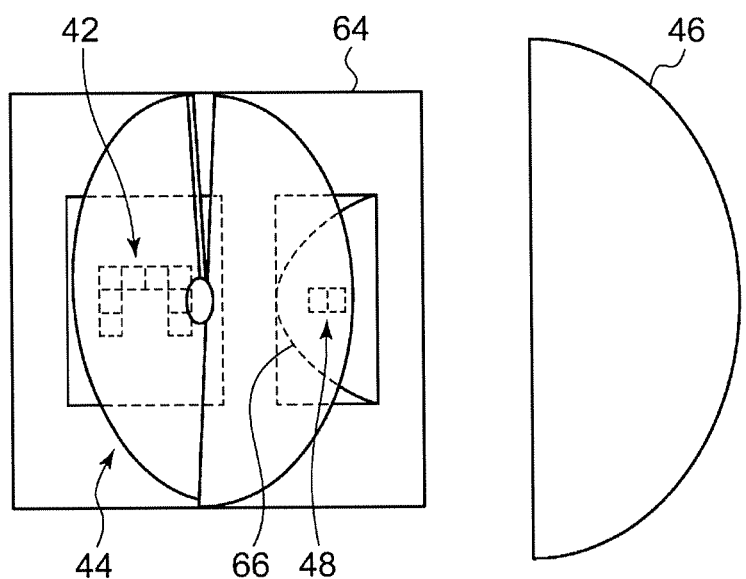
FIG. 13 is a schematic view of the optical unit shown in FIG. 12, as seen from the side.
Figure 14:
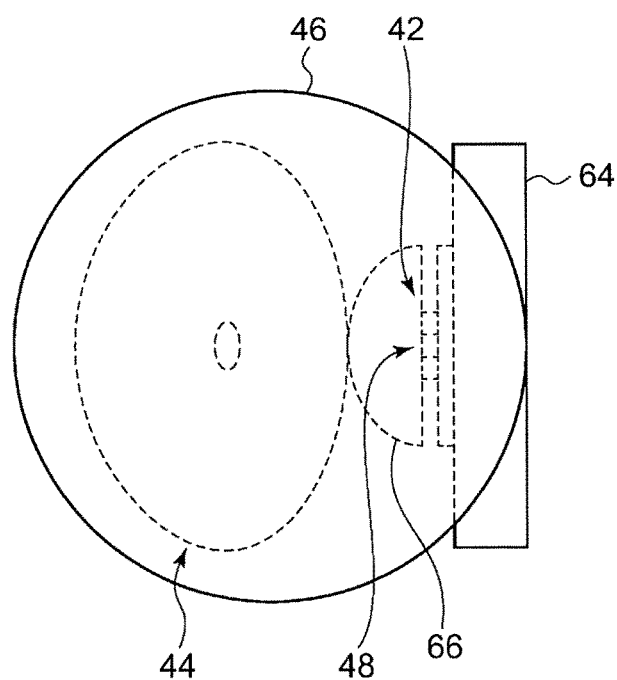
FIG. 14 is a schematic view of the optical unit shown in FIG. 12, as seen from the front.

FIG. 12 is a schematic view of an optical unit 80 according to a third embodiment, as seen from above. FIG. 13 is a schematic view of the optical unit 80 shown in FIG. 12, as seen from the side. FIG. 14 is a schematic view of the optical unit 80 shown in FIG. 12, as seen from the front. Meanwhile, the same components as those of the optical units according to the first and second embodiments are denoted by the same reference numerals, and explanation thereof is appropriately omitted.

The optical unit 80 according to the third embodiment includes the first light source 42, the rotary reflector 44 rotating around the rotation axis R while reflecting the first light L1 emitted from the first light source 42, the projection lens 46 for projecting the first light L1 reflected by the rotary reflector 44 in the light irradiation direction of the optical unit 80, the second light source 48 disposed between the first light source 42 and the projection lens 46, and a fixed reflector 66 as an optical member for reflecting the second light L2 emitted from the second light source 48 and directing the second light L2 toward the projection lens 46. The second light source 48 is disposed such that the emitted second light L2 is incident on the projection lens 46 without being reflected by the rotary reflector 44.

In this way, it is possible to select optical characteristics of the second light L2 emitted from the second light source 48 without considering the reflection by the rotary reflector 44. Therefore, it is possible to irradiate a wider range with a simple configuration by using the second light source 48 having a wider viewing angle than the first light source 42.

Fourth Embodiment

Figure 15:
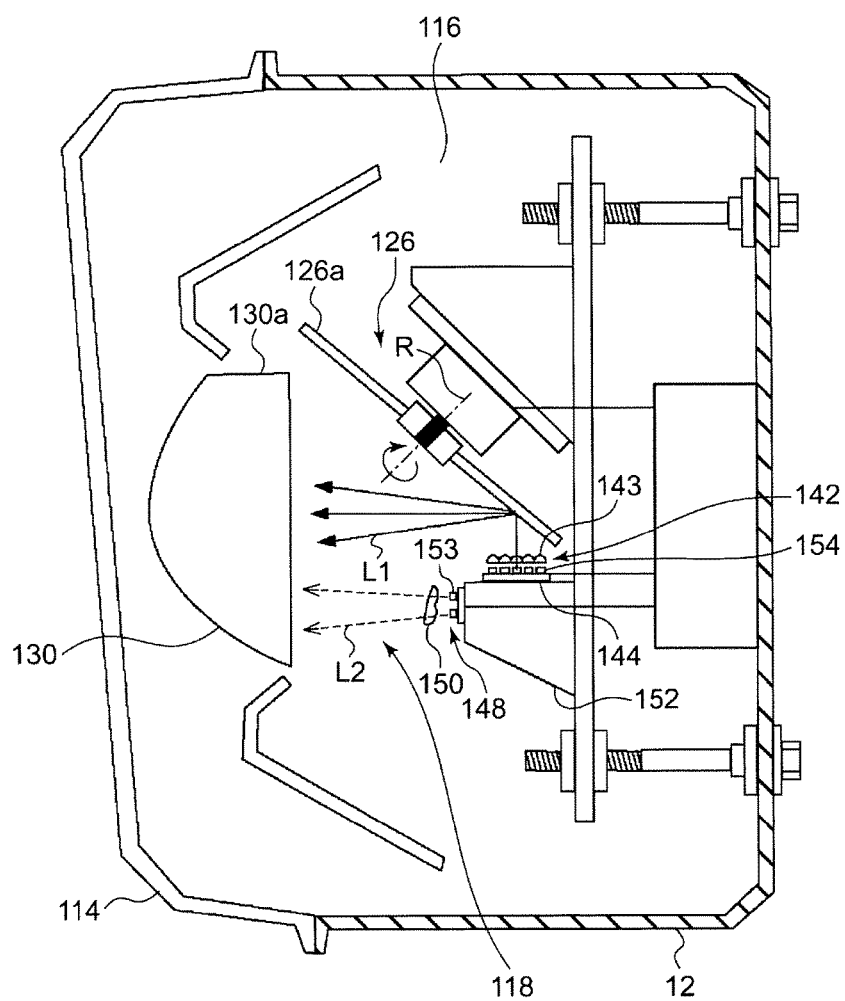
FIG. 15 is a horizontal sectional view of a vehicle headlamp according to a fourth embodiment.
Figure 16:
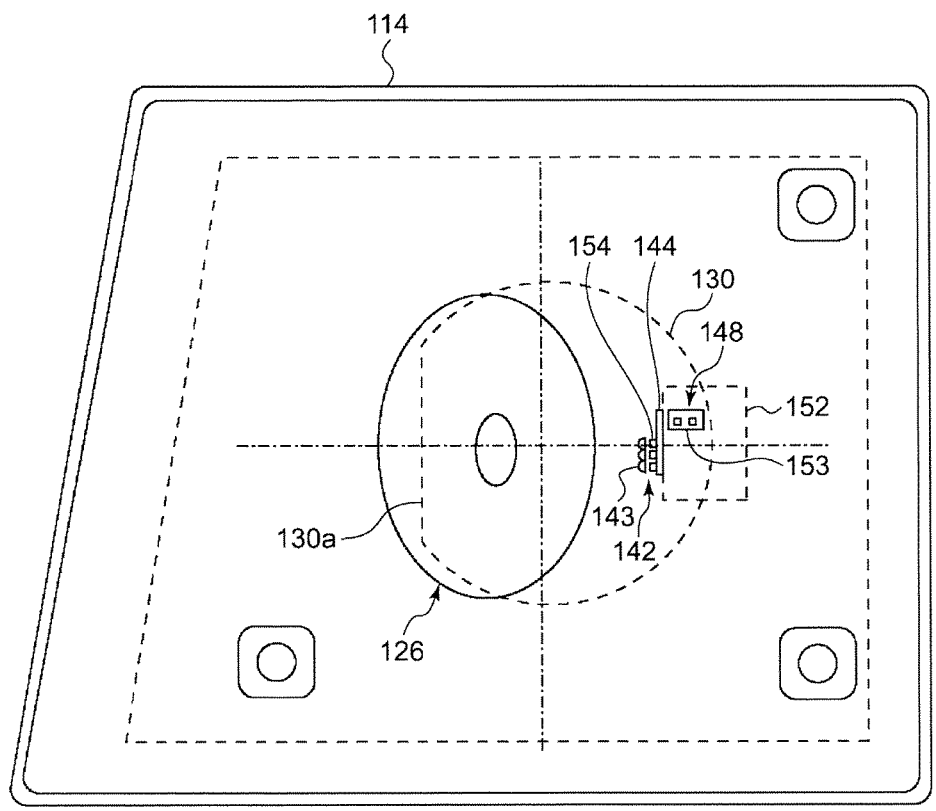
FIG. 16 is a front view of the vehicle headlamp according to the fourth embodiment.

FIG. 15 is a horizontal sectional view of a vehicle headlamp according to a fourth embodiment. FIG. 16 is a front view of the vehicle headlamp according to the fourth embodiment. Meanwhile, some parts are not shown in FIG. 16.

A vehicle headlamp 100 according to the fourth embodiment is a left headlamp mounted on the left side of a front end portion of an automobile and has the same structure as a right headlamp mounted on the right side except that it is bilaterally symmetrical with the right headlamp. Therefore, hereinafter, the left vehicle headlamp 100 will be described in detail, and the description of the right vehicle headlamp will be omitted. Further, the description of the configuration overlapping with the optical units according to the first to third embodiments will be also omitted as appropriate.

As shown in FIG. 15, the vehicle headlamp 100 includes a lamp body 112 having a recess opening forward. The front opening of the lamp body 112 is covered with a transparent front cover 114, thereby forming a lamp chamber 116. The lamp chamber 116 functions as a space in which a single lamp unit 118 is accommodated. The optical unit 118 is an optical unit configured to irradiate both a variable high beam and a low beam. Here, the variable high beam refers to a beam that is controlled to change the shape of a high-beam light distribution pattern. For example, a non-irradiation region (light-shielding portion) can be partially generated in the light distribution pattern.

The optical unit 118 according to the present embodiment includes a first light source 142, a condensing lens 143 as a primary optical system (optical member) for changing an optical path of the first light L1 emitted from the first light source 142 and directing the first light L1 toward a blade 126a of a rotary reflector 126, the rotary reflector 126 rotating around the rotation axis R while reflecting the first light L2, a convex lens 130 as a projection lens for projecting the first light L1 reflected by the rotary reflector 126 in a light irradiation direction (left direction in FIG. 15) of the optical unit, a second light source 148 disposed between the first light source 142 and the convex lens 130, a diffusing lens 150 as a primary optical system (optical member) for changing an optical path of the second light L2 emitted from the second light source 148 and directing the second light L2 toward the convex lens 130, and a heat sink 152 on which the first light source 142 and the second light source 148 are mounted.

The rotary reflector 126 has the same structure as the rotary reflector 26 and the rotary reflector 44 described above. The rotary reflector 126 is provided with the blade 126a as a reflecting surface such that a predetermined light distribution pattern is formed by scanning the front side with the light reflected by the rotary reflector 126 rotating. For each light source, a semiconductor light emitting element such as an LED, an EL element and an LD element is used. Although the shape of the convex lens 130 can be appropriately selected according to the light distribution characteristics such as a light distribution pattern or an illuminance pattern required, an aspherical lens or a free-curved surface lens may be used.

For example, the convex lens 130 according to the present embodiment can be provided with a cutout portion 130a in which a part of the outer periphery of the convex lens 130 is cut out in a vertical direction by devising the arrangement of the respective light sources and the rotary reflector 126. Therefore, the size of the optical unit 118 in the vehicle width direction can be suppressed. Further, the presence of the cutout portion 130a makes it difficult for the blade 126a of the rotary reflector 126 to interfere with the convex lens 130, so that the convex lens 130 and the rotary reflector 126 can be brought close to each other. Further, since a non-circular (straight) portion is formed on the outer periphery of the convex lens 130 when viewing the vehicle headlamp 100 from the front, it is possible to realize a vehicle headlamp of a novel design that includes a lens of an outer shape in which a curve and a straight line are combined as viewed from the front of the vehicle.

Figure 17:
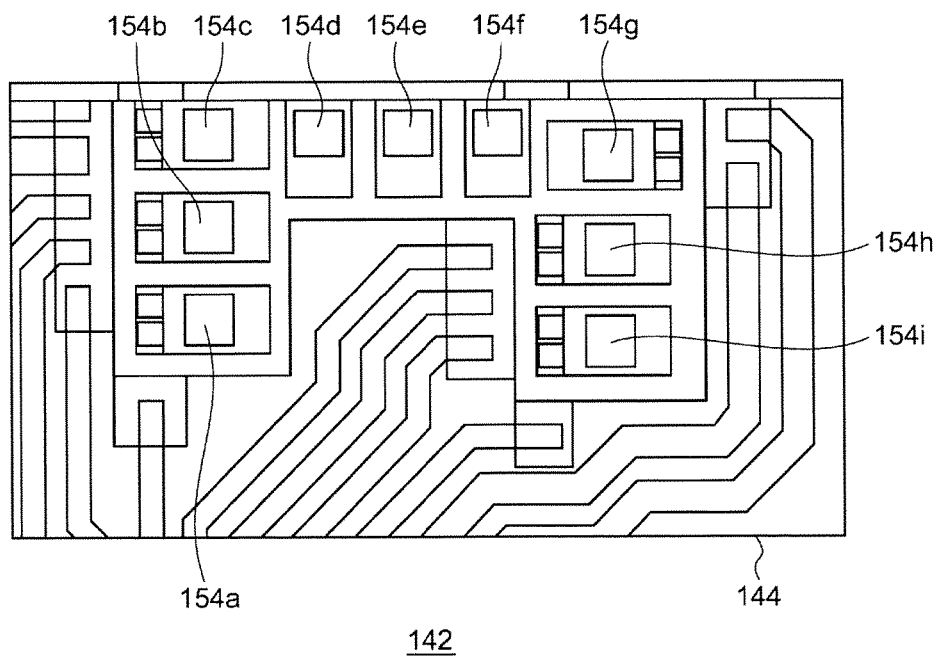
FIG. 17 is a top view of a first light source according to the present embodiment.
Figure 18:
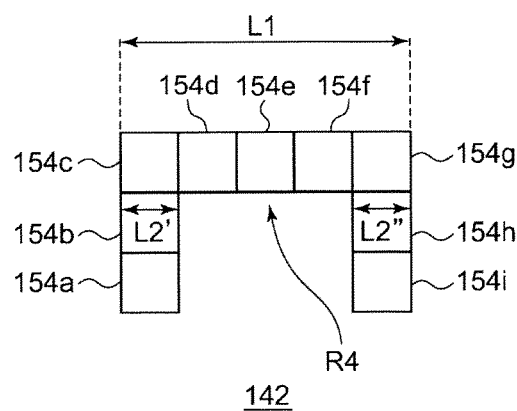
FIG. 18 is a view schematically showing a positional relationship among a plurality of light emitting modules mounted on the first light source.

FIG. 17 is a top view of the first light source 142 according to the present embodiment. FIG. 18 is a view schematically showing a positional relationship among a plurality of light emitting modules mounted on the first light source 142.

In the first light source 142 according to the present embodiment, a plurality of light emitting modules 154 is arranged in an array form. Specifically, as shown in FIG. 17, nine light emitting modules 154 (154a-154i) are arranged in three stages on a circuit board 144. That is, five light emitting modules 154c to 154g are arranged in an upper stage, two light emitting modules 154b, 154h are arranged in a middle stage, and two light emitting modules 154a, 154i are arranged in a lower stage. The two light emitting modules 154b, 154h in the middle stage are disposed adjacent to the lower side of the light emitting modules 154c, 154g at both ends of the five light emitting modules 154c to 154h in the upper stage. The two light emitting modules 154a, 154i in the lower stage are disposed adjacent to the lower side of the two light emitting modules 154b, 154h in the middle stage. Each of the light emitting modules 154a to 154i can be individually turned on/off. Meanwhile, a specific configuration of each light emitting module 154 is the same as that of the light emitting module 54 described above.

As shown in FIGS. 15 and 16, the condensing lens 143 composed of a plurality of inner lenses corresponding to the respective light emitting surfaces is disposed on the side of the light emitting surfaces of the light emitting modules 154 included in the first light source 142. In this way, the light emitted from the light emitting modules 154 reaches the reflecting surface of the rotary reflector 126 without being diverged much.

In the second light source 148, two light emitting modules 153 are arranged side by side in the horizontal direction in an array form, and each of the light emitting modules 153 can be individually turned on/off. A specific configuration of each light emitting module 153 is the same as that of the light emitting module 54.

The second light source 148 according to the present embodiment is disposed such that the second light L2 is incident on the convex lens 130 without being reflected by the rotary reflector 126. In this way, it is possible to select optical characteristics of the second light L2 emitted from the second light source 148 without considering the reflection by the rotary reflector 126. Therefore, for example, the light emitted from the second light source 148 is diffused by the diffusing lens 150 and then is incident on the convex lens 130, so that a wider range can be irradiated. As a result, the second light source 148 can be used as a light source for a low-beam light distribution pattern.

Figure 19:
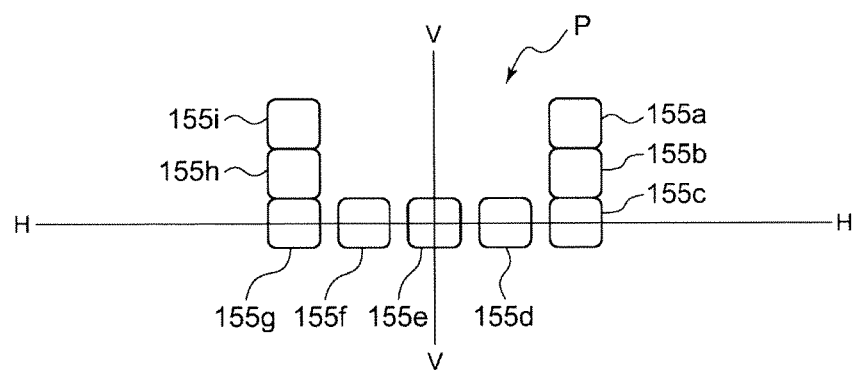
FIG. 19 is a view showing a pattern P projected forward by reflecting a light source image with a stationary rotary reflector in a state where the first light source is fully lit.
Figure 20:
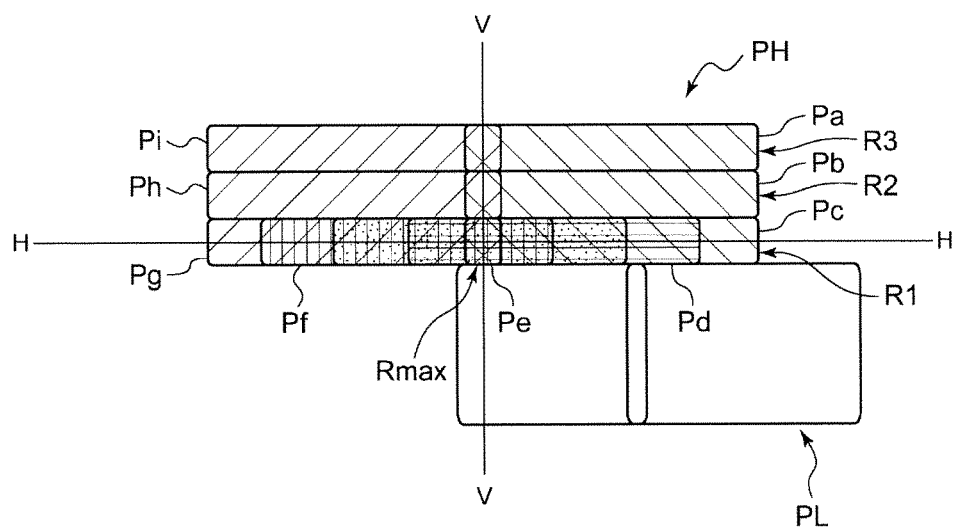
FIG. 20 is a view schematically showing a light distribution pattern formed by a vehicle headlamp including the optical unit according to the fourth embodiment.

FIG. 19 is a view showing a pattern P projected forward by reflecting a light source image with the stationary rotary reflector 126 in a state where the first light source 142 is fully lit. FIG. 20 is a view schematically showing a light distribution pattern formed by the vehicle headlamp 100 including the optical unit according to the fourth embodiment.

The light distribution pattern shown in FIG. 20 is obtained by combining a high-beam light distribution pattern PH and a low-beam light distribution pattern PL. Further, the high-beam light distribution pattern PH is a pattern resulting from scanning the pattern P shown in FIG. 19.

As shown in FIG. 19, a concave pattern P is formed by the light source images 155a to 155i corresponding to the respective light emitting surfaces of the light emitting modules 154a to 154i. Further, scanning patterns Pa to Pi are formed by scanning the respective light source images 155a to 155i, and the high-beam light distribution pattern PH is formed by superimposing the respective scanning patterns Pa to Pi. Meanwhile, a gap between the light emitting module 154a and the light emitting module 154i is set such that the scanning pattern Pa and the scanning pattern Pi are at least partially overlapped. Similarly, a gap between the light emitting module 154b and the light emitting module 154h is set such that the scanning pattern Pb and the scanning pattern Ph are at least partially overlapped.

Further, the light, which is emitted from the light emitting modules 153 of the second light source 148 and diffused by the diffusing lens 150, passes through the convex lens 130 to irradiate the region on the lower side of the H-H line and the right side of the V-V line as the low-beam light distribution pattern PL. Meanwhile, it goes without saying that the entire region on the lower side of the H-H line is irradiated by the pair of left and right vehicle headlamps 100. In this way, since the optical unit 118 according to the present embodiment can project the light emitted from the first light source 142 and the second light source 148 forward by using a common convex lens 130, it is possible to irradiate a wide range with a simple configuration.

The first light source 142 according to the present embodiment includes the light emitting modules 154c to 154g as a first light emitting part configured to emit light for scanning the first region R1 including the maximum luminous intensity region Rmax of the high-beam light distribution pattern PH, the light emitting modules 154b, 154h as a second light emitting part configured to emit light for scanning the second region R2 adjacent to the first region R1, and the light emitting modules 154a, 154i as a third light emitting part configured to emit light for scanning a third region R3 adjacent to the second region R2. The maximum luminous intensity region Rmax of the high-beam light distribution pattern PH according to the present embodiment is a region in the vicinity of an intersection point between the H-H line and the V-V line.

Further, as shown in FIG. 18, in the first light source 142 according to the present embodiment, when the sum of the lengths of the entire light emitting modules 154c to 154g in the longitudinal direction is expressed as L1 and the sum of the lengths of the light emitting modules 154b, 154h in the direction parallel to the longitudinal direction of the entire light emitting modules 154c to 154g is expressed as L2 (L2'+L2 "), a relationship of L1>L2 is satisfied.

In this way, since the optical unit 118 includes the light emitting modules 154b, 154h for scanning the second region R2 adjacent to the first region R1 in addition to the light emitting modules 154c to 154g for scanning the first region R1 including the maximum luminous intensity region, a wider range of irradiation becomes possible while satisfying the maximum luminous intensity.

Further, in the first light source 142 according to the present embodiment, when the number of the light emitting modules 154 for scanning the first region R1 including the maximum luminous intensity region is expressed as N1 (N1=5) and the number of the light emitting modules 154 for scanning the second region R2 is expressed N2 (N2=2), a relationship of N1>N2 is satisfied. In this way, it is possible to suppress the number of the light emitting modules 154 that emit light for scanning the second region R2 not including the maximum luminous intensity region Rmax.

Further, as shown in FIGS. 17 and 18, the area of the second light emitting part (light emitting modules 154b, 154h) is smaller than that of the first light emitting part (light emitting modules 154c to 154g). In this way, for example, the number of the light emitting modules 154 constituting the second light emitting part can be suppressed, as compared with the first light emitting part.

Further, as shown in FIG. 18, the light emitting modules 154b, 154h are a plurality of light emitting regions spaced apart from each other with a non-light emitting region R4 interposed therebetween. In this way, as shown in FIG. 20, it is possible to irradiate the second region R2 over the same wide range as the first region R1 only by two scanning patterns Pb, Ph without increasing the size of the light emitting modules 154b, 154h.

The light emitting modules 154b, 154h are provided adjacent to each of the light emitting modules 154c, 154g positioned at both ends of the light emitting modules 154c to 154g in the longitudinal direction. In this way, the light emitting modules 154b, 154h can irradiate a region having the same width as the region irradiated by the light emitting modules 154c to 154g.

Figure 21A:
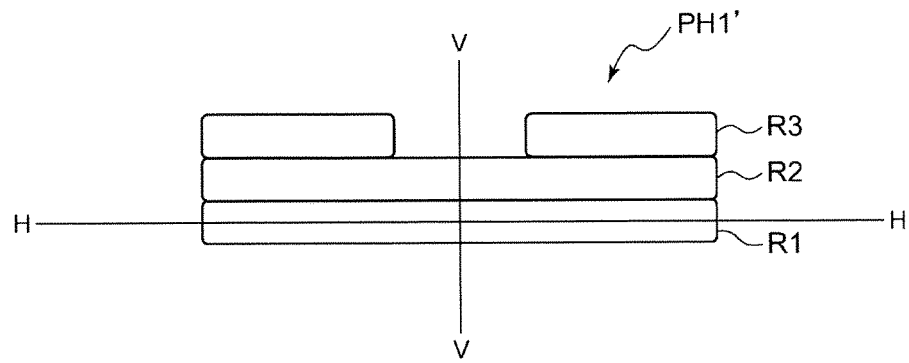
FIGS. 21A to 21C are views showing modifications of a high-beam light distribution pattern by the first light source according to the present embodiment.
Figure 21B:
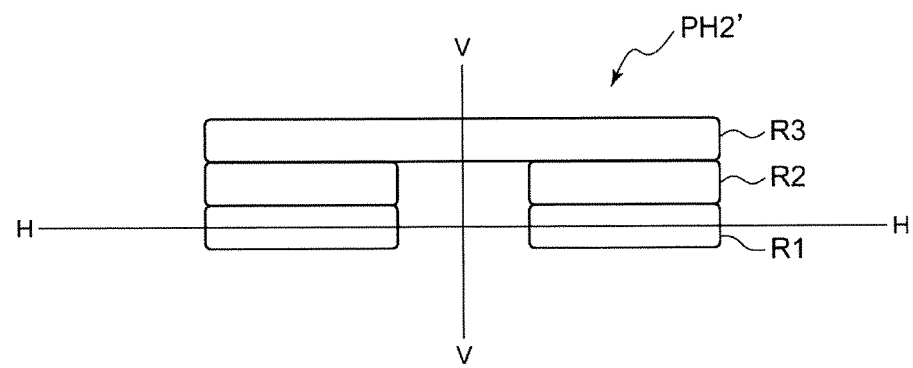
Figure 21C:
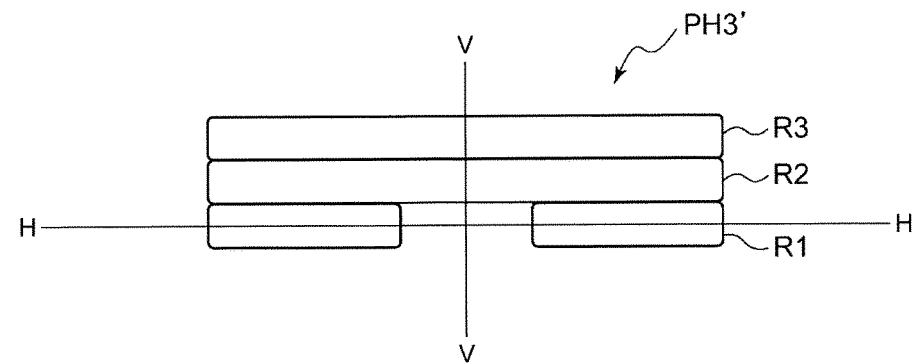

FIGS. 21A to 21C are views showing modifications of the high-beam light distribution pattern by the first light source 142 according to the present embodiment.

A high-beam light distribution pattern PH1' shown in FIG. 21A is a pattern in which a part of the third region R3 is a light-shielding region (non-irradiation region). For this purpose, the light emitting modules 154a, 154i may be turned off at a predetermined timing.

A high-beam light distribution pattern PH2' shown in FIG. 21B is a pattern in which a part of the first region R1 and the second region R2 is a light-shielding region (non-irradiation region). For this purpose, the light emitting modules 154b to 154h may be turned off at a predetermined timing.

A high-beam light distribution pattern PH3' shown in FIG. 21C is a pattern in which a part of the first region R1 is a light-shielding region (non-irradiation region). For this purpose, the light emitting modules 154c to 154g may be turned off at a predetermined timing.

As described above, in the optical unit 118 according to the present embodiment, a plurality of light emitting modules is arranged along the first direction such that the light source images are arranged in the scanning direction (horizontal direction) in order to increase the maximum luminous intensity of the center part of the first region R1, and the light emitting modules are also arranged along the second direction intersecting with the first direction in order to widen the irradiation range in the direction intersecting with the scanning direction.

Hereinabove, the present invention has been described with reference to each of the above-described embodiments. However, the present invention is not limited to each of the above-described embodiments, but a suitable combination or substitution for the configurations of the embodiment is also intended to be included in the present invention. Further, based on the knowledge of those skilled in the art, the combination or the order of processing in each embodiment can be appropriately changed or a modification such as various design changes can be added to each embodiment. An embodiment to which such modification is added can be also included to the scope of the present invention.

The invention claimed is:

1. An optical unit comprising:
a first light source,
a second light source,
a rotary reflector rotating around its rotation axis while reflecting a first light emitted from the first light source, and
a projection lens configured to project the first light reflected by the rotary reflector in a light irradiation direction of the optical unit,
wherein the second light source is disposed such that a second light emitted from the second light source is incident on the projection lens without being reflected by the rotary reflector, and
wherein the projection lens is configured to project the second light in the light irradiation direction of the optical unit.

2. The optical unit according to claim 1,
wherein the second light source is disposed between a substrate on which the first light source is mounted and the rotary reflector, in a front view seen from a front of the vehicle.

3. The optical unit according to claim 1,
wherein the projection lens is configured to project the first light incident thereon after being reflected by the rotary reflector as a condensed light distribution pattern in the light irradiation direction of the optical unit and to project the second light incident thereon without being reflected by the rotary reflector as a diffused light distribution pattern in the light irradiation direction of the optical unit.

4. The optical unit according to any one of claim 1,
wherein the second light source comprises a plurality of light emitting elements arranged in an array form.

5. An optical unit comprising:
a first light source,
a rotary reflector rotating around its rotation axis while reflecting a first light emitted from the first light source,
a projection lens configured to project the first light reflected by the rotary reflector in a light irradiation direction of the optical unit,
a second light source disposed between the first light source and the projection lens, and
an optical member configured to change an optical path of a second light emitted from the second light source and direct the second light toward the projection lens,
wherein the second light source is disposed such that the second light emitted from the second light source is incident on the projection lens without being reflected by the rotary reflector.

6. The optical unit according to claim 5,
wherein the projection lens is configured to project the first light incident thereon after being reflected by the rotary reflector as a condensed light distribution pattern in the light irradiation direction of the optical unit and to project the second light incident thereon without being reflected by the rotary reflector as a diffused light distribution pattern in the light irradiation direction of the optical unit.

7. An optical unit comprising:
a first light source,
a rotary reflector rotating around its rotation axis while reflecting a first light emitted from the first light source,
a projection lens configured to project the first light reflected by the rotary reflector in a light irradiation direction of the optical unit,
a second light source disposed between the first light source and the projection lens, and
an optical member configured to reflect the second light emitted from the second light source and direct the second light toward the projection lens,
wherein the second light source is disposed such that the second light emitted from the second light source is incident on the projection lens without being reflected by the rotary reflector.

8. An optical unit comprising:
a light source, and
a rotary reflector rotating around its rotation axis while reflecting light emitted from the light source,
wherein the rotary reflector is provided with a reflecting surface such that a predetermined light distribution pattern is formed by scanning a front side with a light reflected by the rotary reflector rotating,
wherein the light source comprises:
first light emitting parts configured to emit a first light for scanning a first region including a maximum luminous intensity region of the light distribution pattern, and
second light emitting parts configured to emit a second light for scanning a second region adjacent to the first region without overlapping the first region, and
wherein when a sum of lengths of the first light emitting parts in a longitudinal direction is expressed as $L1$ and a sum of lengths of the second light emitting parts in a direction parallel to the longitudinal direction of the first light emitting parts is expressed as $L2$, a relationship of $L1>L2$ is satisfied.

9. The optical unit according to claim 8,
wherein when a number of light emitting elements constituting the first light emitting parts is expressed as $N1$ and a number of light emitting elements constituting the second light emitting parts is expressed $N2$, a relationship of $N1>N2$ is satisfied.

10. The optical unit according to claim 8,
wherein an area of the second light emitting parts is smaller than an area of the first light emitting parts.

11. The optical unit according to claim 8,
wherein the second light emitting parts comprises a plurality of light emitting regions spaced apart from each other with a non-light emitting region interposed therebetween.

12. The optical unit according to claim 11,
wherein the plurality of light emitting regions is provided adjacent to each of both end portions of the first light emitting parts in the longitudinal direction.

13. The optical unit according to claim 8,
wherein the first region and the second region have identical widths.

* * * * *